United States Patent
Kato et al.

(10) Patent No.: US 8,842,572 B2
(45) Date of Patent: Sep. 23, 2014

(54) INFORMATION PROCESSING APPARATUS, INFORMATION PROCESSING METHOD AND PROGRAM

(75) Inventors: Tatsunori Kato, Tokyo (JP); Hiroki Nagahama, Tokyo (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 13/044,615

(22) Filed: Mar. 10, 2011

(65) Prior Publication Data
US 2011/0228698 A1 Sep. 22, 2011

(30) Foreign Application Priority Data
Mar. 17, 2010 (JP) ................................. 2010-060868

(51) Int. Cl.
*G06F 11/00* (2006.01)
*G06F 13/40* (2006.01)
*G06F 13/38* (2006.01)

(52) U.S. Cl.
CPC .... *G06F 13/4022* (2013.01); *G06F 2213/3812* (2013.01); *G06F 2213/4002* (2013.01); *G06F 13/385* (2013.01)
USPC .......................................... 370/253; 710/305

(58) Field of Classification Search
USPC .......................................... 370/253; 710/305
See application file for complete search history.

(56) References Cited

U.S. PATENT DOCUMENTS

| 6,898,654 | B1 * | 5/2005 | Senior et al. .................. 710/305 |
| 2002/0188791 | A1 * | 12/2002 | Klinger ......................... 710/305 |
| 2010/0057972 | A1 * | 3/2010 | Stangl et al. .................. 710/305 |
| 2010/0262745 | A1 * | 10/2010 | Huang et al. .................. 710/305 |

FOREIGN PATENT DOCUMENTS

JP 2002-281034 A 9/2002

* cited by examiner

*Primary Examiner* — Andrew Lai
*Assistant Examiner* — Jamaal Henson
(74) *Attorney, Agent, or Firm* — Wolf, Greenfield & Sacks, P.C.

(57) ABSTRACT

There is provided an information processing apparatus including one host controller which communicates with other devices via multiple ports, a monitoring unit which monitors an amount of traffic for each of the ports, a processing unit which gives notification of an required amount of traffic for performing predetermined processing by a device connected to a certain port of the multiple ports, and a communication control unit which controls an amount of traffic for each of the ports, based on a required amount of traffic, notification of which is given from the processing unit, and an actual amount of traffic acquired by the monitoring unit.

11 Claims, 6 Drawing Sheets

INFORMATION PROCESSING APPARATUS, INFORMATION PROCESSING METHOD AND PROGRAM

CROSS REFERENCES TO RELATED APPLICATIONS

The present application claims priority to Japanese Priority Patent Application JP 2010-060868 filed in the Japan Patent Office on Mar. 17, 2010, the entire content of which is hereby incorporated by reference.

BACKGROUND OF THE INVENTION

1. Field of the Invention

The present invention relates to an information processing apparatus, an information processing method and a program.

2. Description of the Related Art

In recent years, it is possible to connect many peripheral devices such as a display, a keyboard, a mouse, a hard disk, and a digital camera to a device mounted with a host controller, according to a general interface specification such as Universal Serial Bus (USB). Multiple ports are usually connected to one host controller, and the host controller controls all peripheral devices connected to the multiple ports. Here, a communication band used for information transfer between a host controller and a peripheral device is predetermined on a host-controller basis. For this reason, when multiple peripheral devices are connected to one host controller, the connected peripheral devices share a predetermined communication band.

Incidentally, in some cases, a certain communication rate needs to be secured in processing that a device mounted with a host controller performs by the use of a peripheral device. For example, when a storage device is connected as a peripheral device and recording on the storage device is performed, when images recorded on a storage device are reproduced on a device mounted with a host controller, or the like, it is preferred that a communication rate is secured in order to keep video quality.

Accordingly, an information transfer apparatus capable of securing a communication band by utilizing isochronous transfer is disclosed in JP-A-2002-281034, for example. Or more specifically, a television set is proposed which is capable of, due to the fact that the television set is mounted with multiple host controllers and a certain host controller has only one connection port, securing a communication rate at the communication with a peripheral device connected to the port.

SUMMARY OF THE INVENTION

However, there was an issue that the information transfer apparatus described in JP-A-2002-281034 could not be applied to communication with a device which could not utilize isochronous transfer. Especially, a USB mass storage class device cannot utilize isochronous transfer. For this reason, the application range of the information transfer apparatus described in JP-A-2002-281034 is limited. Further, there was an issue a cost increased in a case where multiple host controllers were mounted.

In light of the foregoing, it is desirable to provide an information processing apparatus, an information processing method, and a program, which are novel and improved, and which are capable of securing, by one host controller, a communication rate at the communication with a certain peripheral device.

According to an embodiment of the present invention, there is provided an information processing apparatus including one host controller which communicates with other devices via multiple ports, a monitoring unit which monitors an amount of traffic for each of the ports, a processing unit which gives notification of an required amount of traffic for performing predetermined processing by a device connected to a certain port of the multiple ports, and a communication control unit which controls an amount of traffic for each of the ports, based on a required amount of traffic, notification of which is given from the processing unit, and an actual amount of traffic acquired by the monitoring unit.

The communication control unit may control an amount of traffic for each of the ports, by controlling the host controller to communicate at an amount of traffic based on the required amount of traffic and the actual amount of traffic.

The communication control unit may control the host controller to communicate with a device connected to the certain port at the required amount of traffic and to communicate with a port other than the certain port within a remaining amount of traffic in which the required amount of traffic is removed from an amount of traffic available to the host controller.

The information processing apparatus may further include a power supply unit which supplies power to the multiple ports. The communication control unit may control an amount of traffic for each of the ports by causing the power supply unit to cut off power supply to a port other than the certain port, based on the required amount of traffic and the actual amount of traffic.

The monitoring unit may give notification of an actual amount of traffic for the certain port according to an instruction of the processing unit.

The monitoring unit may notify the processing unit of an actual amount of traffic for the certain port, when the actual amount of traffic for the certain port is less than or equal to a predetermined threshold.

The ports may be each a port prescribed in Universal Serial Bus Specification.

The predetermined processing may be video recording processing onto a recording medium which is possessed by a device connected to the certain port.

According to another embodiment of the present invention, there is provided an information processing method, where predetermined processing of the method, which is realized by causing an arithmetic processing unit of an information apparatus having one host controller which communicates with other devices via multiple ports to perform the predetermined processing, includes the steps of monitoring an amount of traffic for each of the ports, giving notification of an required amount of traffic for performing predetermined processing by a device connected to a certain port, and controlling an amount of traffic for each of the ports based on the required amount of traffic and an actual amount of traffic acquired by the step of monitoring.

According to another embodiment of the present invention, there is provided a program for causing a computer with one host controller communicating with other devices via multiple ports to function as a monitoring unit which monitors an amount of traffic for each of the ports, a processing unit which gives notification of an required amount of traffic for performing predetermined processing by a device connected to a certain port, and a communication control unit which controls an amount of traffic for each of the ports based on a required amount of traffic, notification of which is given from the processing unit, and an actual amount of traffic acquired by the monitoring unit.

According to the embodiments of the present invention described above, it is possible to secure, by one host controller, a communication rate during communication with a certain peripheral device.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.

1. First embodiment (Example of controlling host controller)

2. Second embodiment (Example of controlling power supply)

1. First Embodiment

[Outline]

Figure 1:
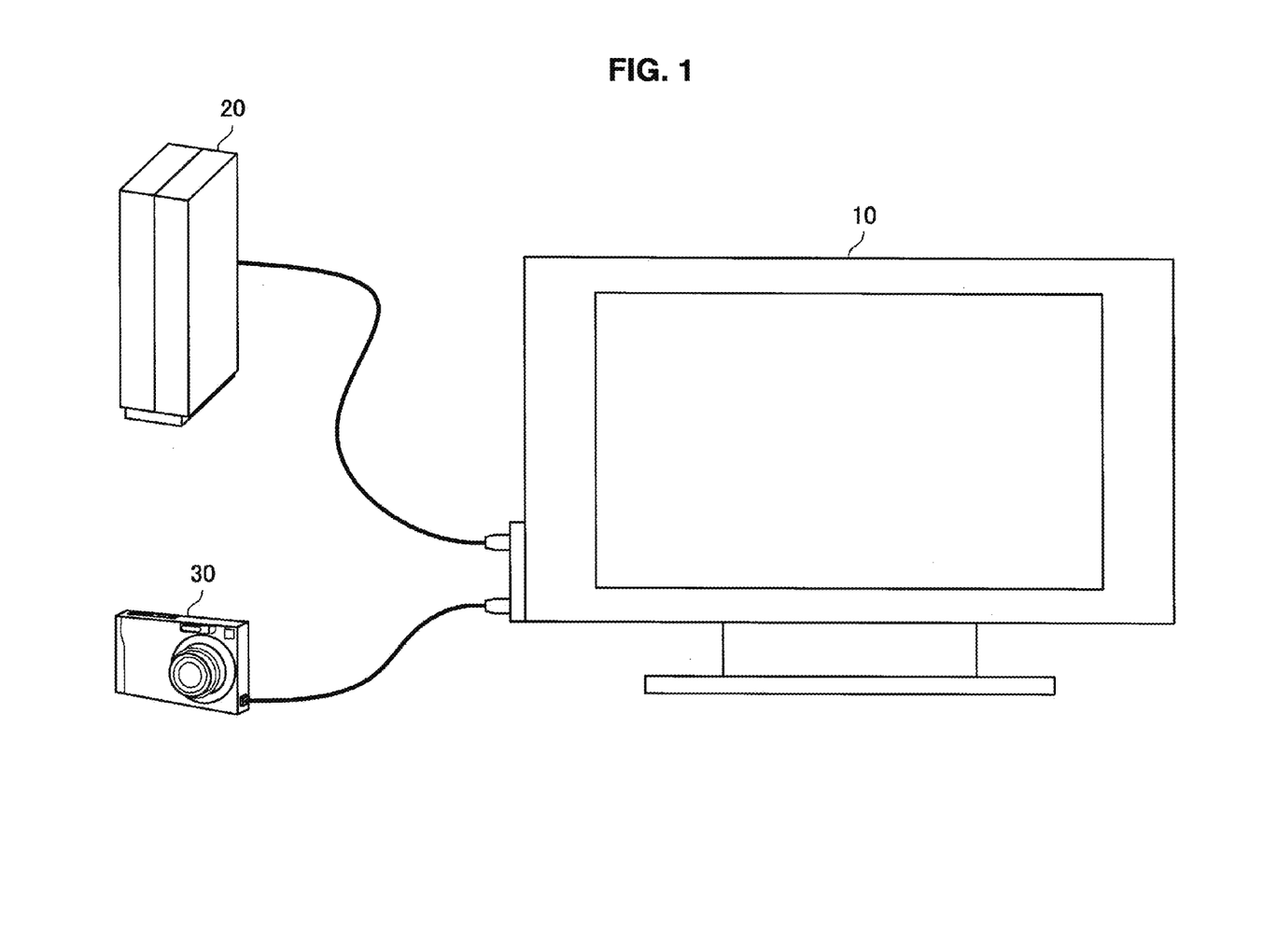
FIG. 1 is an explanatory diagram showing an outline of each of a first and a second embodiments of the present invention.

First, a first embodiment of the present invention will be explained with reference to FIG. 1. FIG. 1 is an explanatory diagram showing an outline of the first embodiment of the present invention.

A television set 10, which is a device mounted with a host controller according to the embodiment, is an information processing apparatus mounted with one host controller and has multiple USB ports connected to the one host controller. A Hard Disc Drive (HDD) 20 and a digital camera 30 are each connected via a USB cable to a USB port of the television set 10.

The television set 10 can perform various processing by a peripheral device connected via a USB port. For example, the television set 10 can record a received broadcasting program on the HDD 20 connected via a USB port. Further, the television set 10 can reproduce images stored in the HDD 20. Alternatively, the television set 10 can reproduce pictures stored in the digital camera 30 (or stored in a recording medium connected to the digital camera 30) as slide show.

For example, when pictures stored in the digital camera 30 are reproduced as slide show on the television set 10 while the television set 10 records a broadcasting program on the HDD 20, communication between the television set 10 and the peripheral devices some times becomes unstable due to the shortage of a communication band. In such case, even if reproduction of pictures with slide show stops, the reproduction may be resumed later. However, when data for video recording has been discarded, the discarded data for video recording cannot be restored. Accordingly, it is assumed that a user wants to prioritize the communication between the television set 10 and the HDD 20 over the communication between the television set 10 and the digital camera 30.

However, in the related art, the television set 10 uniformly performed communication control without consideration of details of processing by a peripheral device. For this reason, there was a case where an amount of traffic with the HDD 20 for video recording could not be secured due to an amount of traffic with the digital camera 30.

In light of the foregoing, the television set 10 according to an embodiment of the present invention performs control, by controlling an amount of traffic with a peripheral device connected via a USB port, such that an amount of traffic with a peripheral device connected to a certain port (here, the HDD 20) can be secured. Here, there are basically two control methods of securing an amount of traffic. The first method is a method in which an required amount of traffic, used for processing performed by the use of a peripheral device connected to a certain port (here, video recording), is acquired and an amount of traffic with a peripheral device connected to each port is controlled such that an amount of traffic with the peripheral device connected to the certain port becomes equal to the required amount of traffic. The second method is a method of controlling an amount of traffic by cutting off power supply to a port other than a certain port. With respect to these two methods, the first method will be explained in the first embodiment and the second method in a second embodiment hereafter.

Besides, in the explanation below, a case where a device mounted with a host controller is a television set and peripheral devices are a HDD and a digital camera will be explained as an example, but the present invention is not limited thereto. A device mounted with a host controller may be an information processing apparatus having a host commuter and multiple ports connected to the host controller. Further, a peripheral device may be a USB device connectable to the device mounted with a host controller according to USB. Furthermore, in the explanation below, a case where a host controller is a USB host controller and a port is a USB port will be explained as an example, but the present invention is not limited thereto.

[Functional Configuration]

Figure 2:
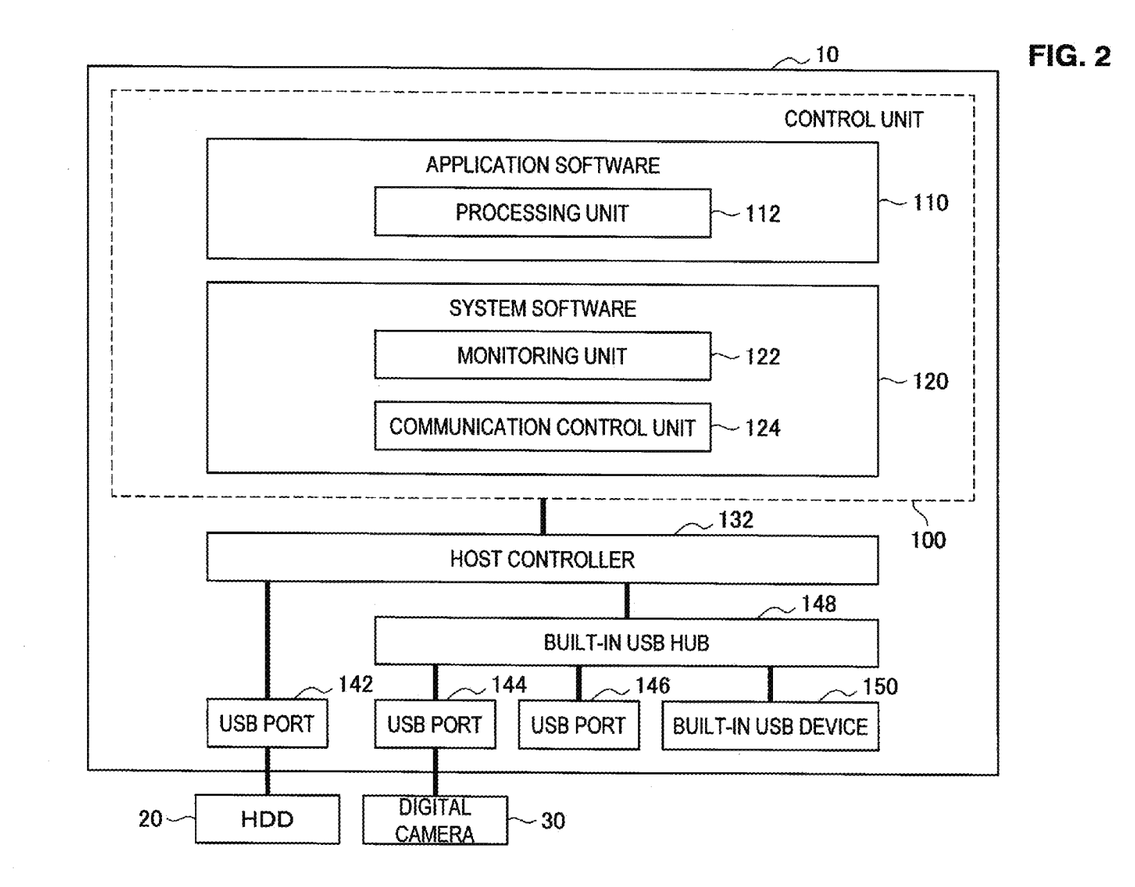
FIG. 2 is a block diagram illustrating a configuration of a device mounted with a host controller according to the first embodiment of the present invention.

Next, a configuration of a device mounted with a host controller according to the present embodiment will be explained. FIG. 2 is a block diagram illustrating the configuration of the device mounted with a host controller according to the present embodiment.

The television set 10, which is a device mounted with a host controller according to the present embodiment, mainly has a control unit 100, a host controller 132, a first USB port 142, a second USB port 144, a third USB port 146, a built-in USB hub 148, and a built-in USB device 150.

The control unit 100 has a function of controlling the entire television set 10. The control unit 100 may be achieved by an arithmetic device such as a Central Processing Unit (CPU) reading out a control program from a recoding medium, such as a Read Only Memory (ROM) and a Random Access Memory (RAM), which stores a control program in that a processing procedure to realize the later-described function of the control unit 100 is described, and interpreting and executing the program.

The control unit 100 further has a function of application software 110 and system software 120. The application software 110 has function as a processing unit 112 which performs predetermined processing by a peripheral device. For example, in the present embodiment, the processing unit 112 performs processing of recording a broadcasting program received by the television set 10 in a memory area of the HDD 20, which is a peripheral device connected to the first USB port 142. The processing unit 112 calculates from the setting relating video recording (for example, image quality), or the like an required amount of traffic for video recording processing by the HDD 20 connected to the first USB port 142, and notifies the system software 120 of the same.

The system software 120 has a function as a monitoring unit 122 which monitors an actual amount of traffic for each of the multiple ports connected to a host controller 132. Hereafter, an actual amount of traffic acquired by the monitoring unit 122 will be referred to as an actual amount of traffic in terms of distinction from a required amount of traffic. Here, the monitoring unit 122 determines the actual amount of traffic from data traffic and required time taken for the data transfer. Further, the system software 120 has a function as a communication control unit 124 which controls an amount of traffic for each of multiple ports connected to the host controller 132. The communication control unit 124 controls an amount of traffic for each port, based on the required amount of traffic, notification of which is given from the processing unit 112, and the actual amount of traffic acquired by the monitoring unit 122. In the present embodiment, the communication control unit 124 controls an amount of traffic, by controlling a host controller 132 such that each port communicates at an amount of traffic based on the required amount of traffic and the actual amount of traffic.

More specifically, the communication control unit 124 controls the host controller 132 to communicate with the HDD 20, which is a peripheral device used for video recording processing, at the required amount of traffic and to communicate with a peripheral device connected to a port other than a certain port connected to the HDD 20, within a remaining amount of traffic in which the required amount of traffic is removed from an amount of traffic available to the host controller. In the example of FIG. 2, as devices each connected to a port other than a certain port (the first USB port 142) mentioned are the digital camera 30 connected to the second USB port 144 and the built-in USB device 150 connected to the built-in USB hub 148. In this case, the communication control unit 124 controls the host controller 132 such that the digital camera 30 and the built-in USB device 150 share the remaining amount of traffic.

The host controller 132 controls a device connected to itself according to the control by the control unit 100. In the present embodiment, the host controller 132 controls the connected device according to a control method defined in USB specification. More specifically, the host controller 132 controls timing of communication with each peripheral device, by sending to a connected peripheral device a message to initiate data transmission or reception. Unless each peripheral device receives this message from the host controller, each peripheral device cannot transmit or receive a packet.

The first USB port 142, the second USB port 144, and the third USB port 146 are each a port prescribed in USB specification, and are each an interface to which a USB device is connected. In the present embodiment, these USB ports are each a wired interface which connects to a USB device via a USB cable, but it is not limited thereto. The USB ports may be each a wireless interface, for example. The first USB port 142 is directly connected to the host controller 132, and the second USB port 144 and the third USB port 146 are each connected via the built-in USB hub 148 to the host controller 132.

The built-in USB hub 148 is built in the television set 10 and is a hub to which multiple USB devices are connected. In the present embodiment, the built-in USB hub 148 is connected to the host controller 132 and is further connected to the second UAB port 144, the third USB port 146, and the built-in USB device 150.

[Operation]

Figure 3:
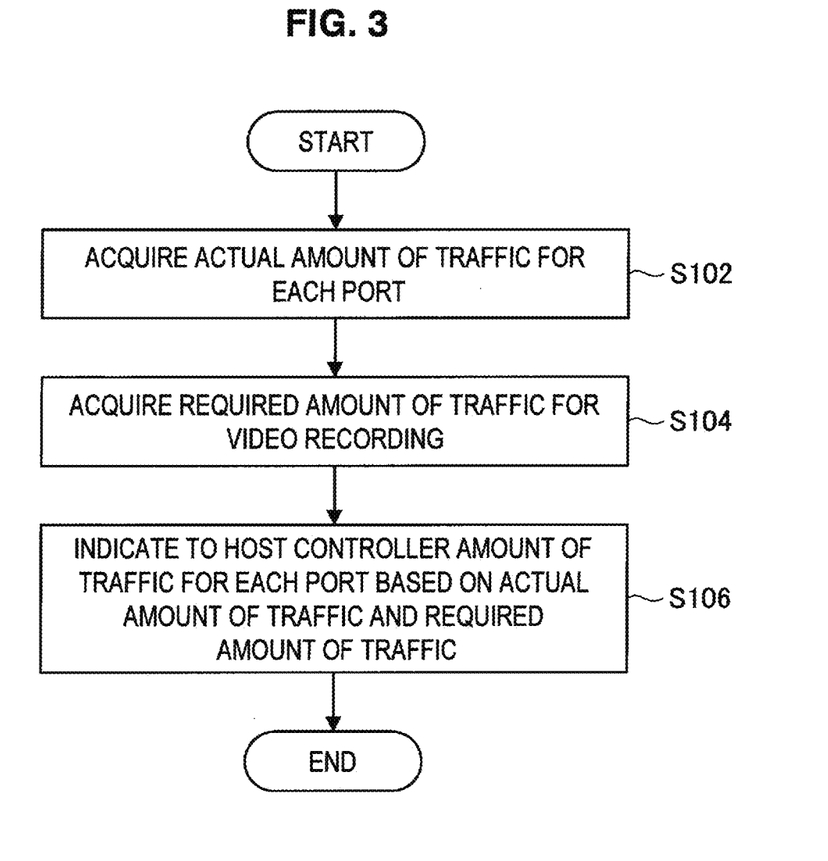
FIG. 3 is a flowchart showing operation of a communication control unit according to the embodiment.

Next, operation of communication control in the television set 10 with the configuration described above will be explained with reference to FIG. 3. FIG. 3 is a flowchart showing operation of the communication control unit 124.

When a USB device is connected to any of the USB ports connected to the host controller, the monitoring unit 122 continuously notifies the communication control unit 124 of an actual amount of traffic for each port. And the communication control unit 124 acquires the actual amount of traffic from the notification from the monitoring unit 122 (S102). Then, application software performs processing for video recording. Here, the processing unit 112 calculates a required amount of traffic used for video recording and notifies the communication control unit 124 of the same. When the communication control unit 124 acquires the required amount of traffic from the notification from the processing unit 112 (S104), the communication control unit 124 calculates, based on the actual amount of traffic and the required amount of traffic, an amount of traffic with a device connected to the host controller, and indicates the same to the host controller 132 (S106).

The communication control unit 124 continuously performs control of an amount of traffic of the step S106. The host controller 132 communicates with each USB device according to the control by the communication control unit 124. More specifically, an amount of traffic is controlled such that host controller 132 can communicate at an amount of traffic indicated by the communication control unit 124, by changing a ratio according to which transmission of data is requested from each USB device.

Figure 4:
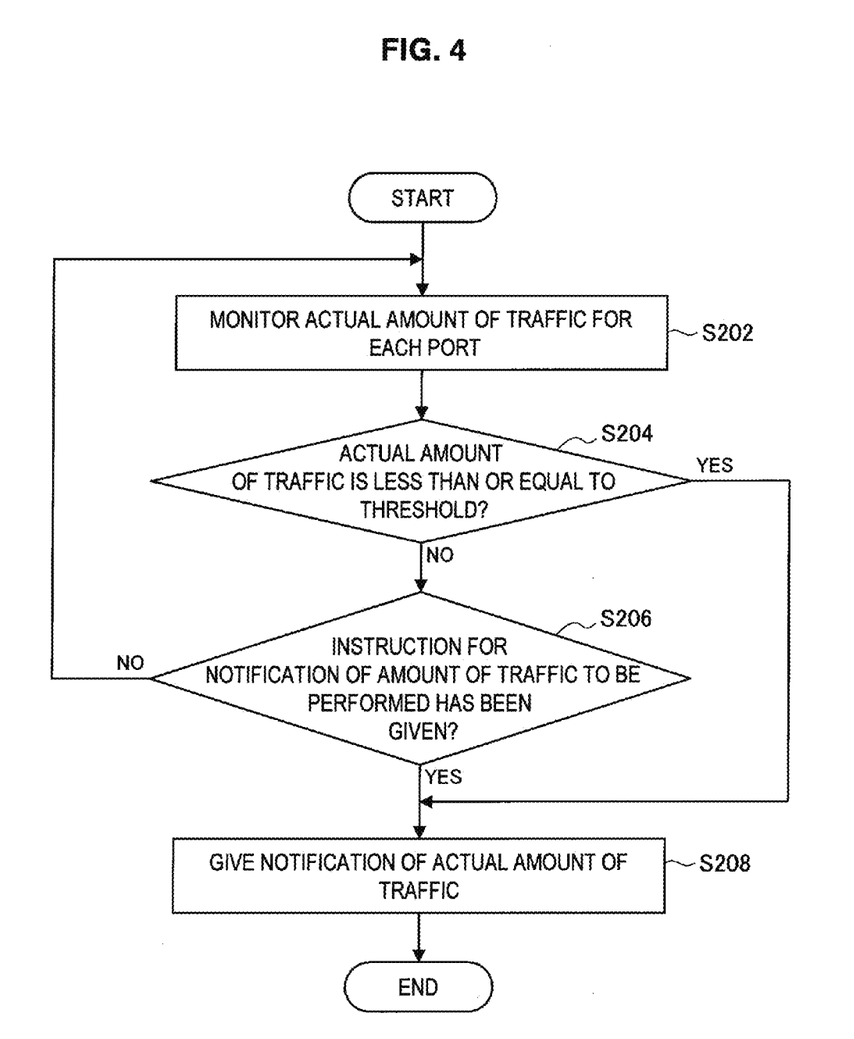
FIG. 4 is a flowchart showing operation of a monitoring unit according to the embodiment.

Further, the monitoring unit 122 has a function of not only notifying the communication control unit 124 of the actual amount of traffic described above, but also providing the application software 110 with information on the actual amount of traffic. This information providing operation is shown in FIG. 4. FIG. 4 is a flowchart showing operation of the monitoring unit 122.

The monitoring unit 122 continuously monitors an actual amount of traffic for each port and notifies the communication control unit 124 of the same (S202). And when an inquiry on the amount of traffic is received from the application software 110, the monitoring unit 112 passively provides the application software 110 with information on the actual amount of traffic. Further, when the actual amount of traffic falls below a predetermined threshold, the monitoring unit 122 actively provides the application software 110 with information on the actual amount of traffic. This threshold may be a value determined based on a required amount of traffic. For example, the threshold may be a value which is greater than the required amount of traffic by a predetermined amount. In this case, the application software 110, which has received the notification form the monitoring 122, can recognize in advance that the actual amount of traffic could fall below the required amount of traffic.

Accordingly, for example, the monitoring unit 122 first determines whether or not the acquired actual amount of traffic is less than or equal to the threshold (S204), and when it is turned out at the determination of the step S204 that the actual amount of traffic is less than or equal to the threshold, the monitoring unit 122 notifies the application software 110 of the actual amount of traffic (S208). On the other hand, when it is turned out at the determination of the step S204 that the actual amount of traffic is greater than the threshold, the monitoring unit 122 next determines whether or not an instruction for notification of an amount of traffic to be performed has been given from the application software 110 (S206). When it is turned out at the determination of the step S206 that the instruction for notification of an amount of traffic to be performed has been given, the monitoring unit 122 notifies the application software 110 of the actual amount of traffic (S208). On the other hand, when it is turned out at the determination of the step S206 that the instruction for notification of an amount of traffic to be performed has not been given (namely, when the actual amount of traffic is greater than the predetermined threshold and no instruction from the application software 110 has been given), the monitoring unit 122 continuously monitors the actual amount of traffic, returning to the step S202.

In the above, the configuration of the television set 109, which is a device mounted with a host controller according to the first embodiment of the present invention, and the operation of the television set 10 has been explained. As described above, the television set 10 according to the present embodiment controls an amount of traffic with a peripheral device connected to each port, by controlling the host controller 132 such that an amount of traffic with the HDD 20, which is a peripheral device used in processing for which preferential securing of an amount of traffic is desired (here, video recording), becomes equal to an required amount of traffic used for video recording. In a second embodiment to be explained next, an amount of traffic with the HDD 20 is secured, by cutting off power supply to a port other than the port connected to the HDD 20, which is peripheral device used in processing for which preferential securing of an amount of traffic is desired. The method to be explained in the second embodiment may be used in combination with the method according to the first embodiment, or any of the methods may be selectively used.

2. Second Embodiment

[Functional Configuration]

Figure 5:
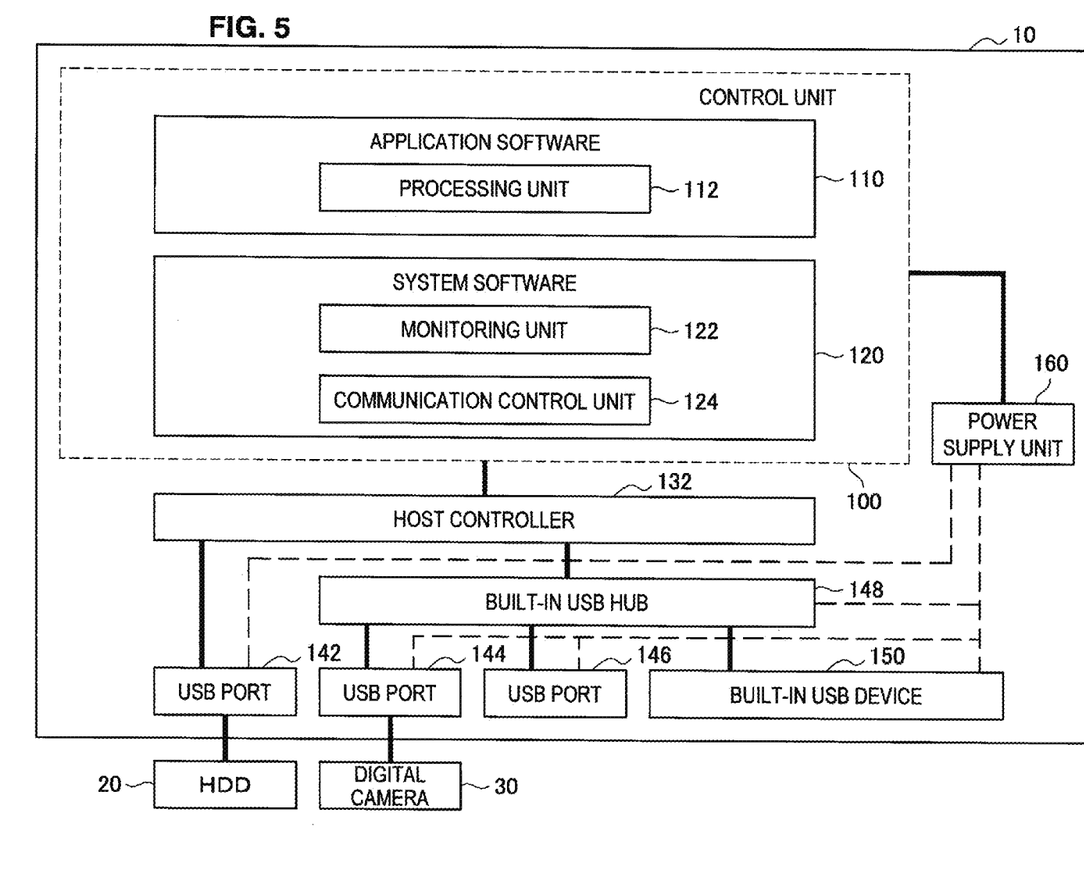
FIG. 5 is a block diagram illustrating a configuration of a device mounted with a host controller according to the second embodiment of the present invention.

FIG. 5 is a block diagram illustrating a configuration of the television set 10 according to a second embodiment of the present invention. Besides, in the explanation below, explanation of the same part as in the configuration that has been explained with reference to FIG. 2 in the first embodiment will be omitted and a different part will be mainly explained.

The television set 10 shown in FIG. 5 mainly has a control unit 100, a host controller 132, a first USB port 142, a second USB port 144, a third USB port 146, a built-in USB hub 148, a built-in USB device 150, and a power supply unit 160.

The television set 10 according to the present embodiment shown in FIG. 5 further has a power supply unit 160 in addition to the arrangement of FIG. 2. The power supply unit 160 supplies power to each part of the television set 10 according to the control from the control unit 100. The power supply unit 160 supplies power to the first USB port 142, the second USB port 144, the third USB port 146, the built-in USB hub 148, and the built-in USB device 150, for example.

When an amount of traffic for the first USB port 142 to which the HDD 20 used for video recording processing is connected could not be secured, the communication control 124 controls the power supply unit 160 to cut off power supply to a port other than the first USB port 142 to which the HDD 20 used for video recording processing is connected, based on a required amount of traffic, notification of which is given from the processing 112, and an actual amount of traffic, notification of which is given from the monitoring unit 122. For example, the communication control unit 124 cuts off power supply to a USB port to which a device with a low priority is connected, from details of processing by a device connected to each USB port. Alternatively, the communication control unit 124 can previously avoid, by cutting off power supply to a USB port to which no device is connected, a new device being connected. For example, when no device is connected to a port other than a port with a high priority and power supply to the USB port to which no device is connected is cut off, monitoring of an amount of traffic is not necessary and does not have to be performed.

[Operation]

Figure 6:
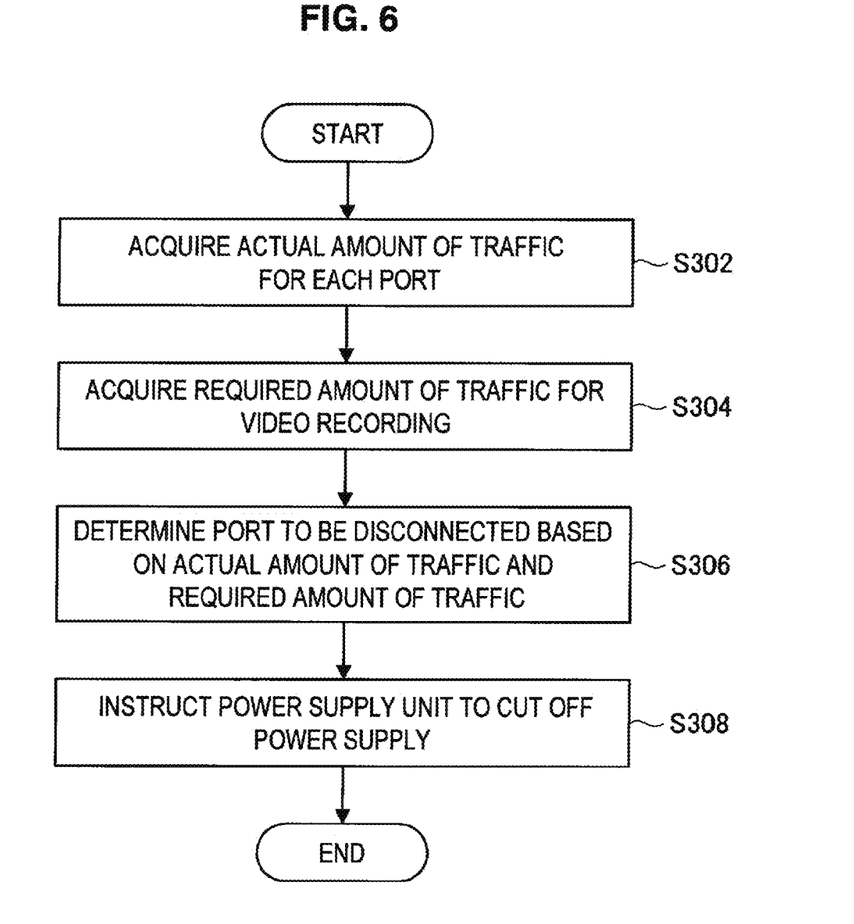
FIG. 6 is a flowchart showing operation of a communication control unit according to the embodiment.

Next, communication control operation in the television set 10 with the above configuration will be explained with reference to FIG. 6. FIG. 6 is a flowchart showing operation of the communication control unit 124.

When a USB device is connected to any of USB ports connected to the host controller, the monitoring unit 12 continuously notifies the communication control unit 124 of an actual amount of traffic for each port. And the communication control unit 124 acquires the actual amount of traffic from the notification from the monitoring unit 122 (S302). Then, the application software performs processing for video recording. Here, the processing unit 112 calculates a required amount of traffic used for video recording and notifies the communication control 124 of the same. When the communication control unit 124 acquires the required amount of traffic from the notification from the processing unit 112 (S304), the communication control unit 124 determines whether or not a port is to be disconnected. And the communication control unit 124 determines a port, power supply to which is to be cut off (S306), and instructs the power supply unit 160 to cut off power supply to the port which has been determined in the step S306 (S308).

For example, even if it is controlled such that an amount of traffic for a port with a high priority is secured, when a device with unstable operation is connected, it sometimes gets into an uncontrollable state. Also in such case, certain communication may be disconnected by cutting off power supply to the corresponding port, and the amount of traffic for a port with a high priority may be secured.

It should be understood by those skilled in the art that various modifications, combinations, sub-combinations and alterations may occur depending on design requirements and other factors insofar as they are within the scope of the appended claims or the equivalents thereof.

For example, in the above embodiment, a peripheral device connects via a USB cable to a device mounted with a host controller, but the present invention is not limited to this example. For example, it may be that a peripheral device is a device having a USB connecter built therein and is directly connected, without a cable, to the device mounted with a host controller.

Further, in the above embodiment, a case where a control unit and a host controller are hardware devices provided in a separated manner has been explained, but the present invention is not limited to this example. For example, the control unit may include the host controller.

Furthermore, in the above embodiment, system software has a function of a communication control unit, but the present invention is not limited to this example. Application software may have, as one function, a part or all of functions of the communication control unit. For example, determination of cut-off of power supply, which has been explained in the second embodiment above, may be made in a processing unit 112. In this case, the processing unit 112 may cut off power supply to a port with a low priority by controlling a power supply unit 160, based on a required amount of traffic calculated by the processing unit 112 itself and an actual amount of traffic, notification of which has been given from a monitoring unit 122. Alternatively, the processing unit 112 may previously avoid, by cutting off power supply to a USB port to which no device is connected, a new device being connected.

Besides, in the first embodiment above, the power supply unit is not shown in the functional block diagram of FIG. 2, but it does not necessarily mean that the power supply unit is not provided. Only components indispensable for explanation of the invention were merely shown, and the power supply unit may be provided as in the second embodiment.

Besides, in the present specification, steps described in the flowcharts include not only processing performed chronologically in accordance with the described order, but also processing performed in a parallel or individual manner, even though it is not necessarily processed chronologically. It should be appreciated that the order of the steps processed chronologically may be also appropriately changed in some cases.

The present application contains subject matter related to that disclosed in Japanese Priority Patent Application JP 2010-060868 filed in the Japan Patent Office on Mar. 17, 2010, the entire content of which is hereby incorporated by reference.

What is claimed is:

1. An information processing apparatus comprising:
   a host controller configured to communicate with other devices via multiple ports;
   a monitoring unit configured to monitor an amount of traffic for each of the multiple ports, the amount of traffic being an amount of data transmitted and/or received by a respective port of multiple ports during a first time period;
   a processing unit configured to give notification of a required amount of traffic for performing predetermined processing by a device connected to a first port of the multiple ports; and
   a communication control unit configured to control the amount of traffic for each of the multiple ports, based at least in part on the required amount of traffic, notification of which is given from the processing unit, and a measured amount of traffic acquired by the monitoring unit.

2. The information processing apparatus according to claim 1,
   wherein the communication control unit controls the amount of traffic for each of the multiple ports by controlling the host controller to communicate at a communication rate based at least in part on the required amount of traffic and the measured amount of traffic.

3. The information processing apparatus according to claim 2,
   wherein the communication control unit controls the host controller to communicate with a device connected to the first port at the required amount of traffic and to communicate with a port other than the first port within a remaining amount of traffic in which the required amount of traffic is removed from an amount of traffic available to the host controller.

4. The information processing apparatus according to claim 1, further comprising:
   a power supply unit to supply power to the multiple ports,
   wherein the communication control unit controls the amount of traffic for each of the multiple ports by causing the power supply unit to cut off power supply to a port other than the first port, based at least in part on the required amount of traffic and the measured amount of traffic.

5. The information processing apparatus according to claim 1,
   wherein the monitoring unit gives notification of a measured amount of traffic for the first port according to an instruction of the processing unit.

6. The information processing apparatus according to claim 1,
   wherein the monitoring unit notifies the processing unit of a measured amount of traffic for the first port, when the measured amount of traffic for the first port is less than or equal to a predetermined threshold.

7. The information processing apparatus according to claim 1,
   wherein each of the multiple ports is a port described in Universal Serial Bus Specification.

8. The information processing apparatus according to claim 1,
   wherein the predetermined processing is video recording processing onto a recording medium associated with a device connected to the first port.

9. An information processing method, performed by an arithmetic processing unit of an information apparatus comprising a host controller which communicates with other devices via multiple ports, the method comprising the steps of:
   monitoring an amount of traffic for each of the multiple ports, the amount of traffic being an amount of data transmitted and/or received by a respective port of the multiple ports during a first time period;
   giving notification of a required amount of traffic for performing predetermined processing by a device connected to a first port of the multiple ports; and
   controlling the amount of traffic for each of the multiple ports based at least in part on the required amount of traffic and a measured amount of traffic acquired by the step of monitoring.

10. A non-transitory recording medium having stored thereon a program, that when executed causes a computer comprising a host controller communicating with other devices via multiple ports to function as:
   a monitoring unit configured to monitor an amount of traffic for each of the multiple ports, the amount of traffic being an amount of data transmitted and/or received by a respective port of the multiple ports during a first time period;
   a processing unit configured to give notification of a required amount of traffic for performing predetermined processing by a device connected to a first port; and
   a communication control unit configured to control the amount of traffic for each of the multiple ports based on at least in part on the required amount of traffic, notification of which is given from the processing unit, and a measured amount of traffic acquired by the monitoring unit.

11. The information processing apparatus according to claim 1, wherein the measured amount of traffic is determined, at least in part, by examining one or more data packets.

* * * * *